(12) United States Patent
Perkins

(10) Patent No.: X3081
(45) Date of Patent: Feb. 27, 1819

(54) PRESS, LEVER, PROGRESSIVE

(76) Inventor: Jacob Perkins

United States Patent

Patent No.: X3081

Jacob Perkins of Philadelphia Pa
Feb. 27. 1819.
Progressive Lever Press. See London Journal
of Arts & Sciences Vol. 1. page 161. 1820.

DRAFTSMAN'S DIVISION.

*All communications should be addressed to*
"The Commissioner of Patents,
Washington, D. C."

2—328 a.

*DEPARTMENT OF THE INTERIOR,*

United States Patent Office.

*Washington, D. C.,* ............................, *189*__

*SIR:*

*The printed* ........copies........ *of Patent No.* J Perkins
........are........ *exhausted.* Feb 27, 1819

*As soon as reprinted a copy will be mailed you to complete your order.*

..........................................................................................

..........................................................................................

*By direction of the Commissioner:*

*Very respectfully,*

..........................................................

*Chief Clerk.*

..........................................................

..........................................................

..........................................................

3148b6-97-5m